United States Patent [19]

Cawley

[11] 4,054,232
[45] Oct. 18, 1977

[54] FLUID CONTAINERS
[75] Inventor: John Duval Cawley, Rochester, N.Y.
[73] Assignee: Eastman Kodak Company, Rochester, N.Y.
[21] Appl. No.: 683,363
[22] Filed: May 5, 1976
[51] Int. Cl.² .......................................... B65D 35/08
[52] U.S. Cl. .............................. 222/107; 96/76 C; 428/194; 428/201; 428/35
[58] Field of Search ............ 526/320, 321; 206/484; 428/194, 201, 354, 355, 500, 522, 524, 35; 222/107; 96/76 C

[56] References Cited
U.S. PATENT DOCUMENTS

| 2,634,886 | 4/1953 | Land | 222/107 |
|---|---|---|---|
| 3,056,492 | 10/1962 | Campbell | 206/84 |
| 3,438,550 | 4/1969 | Young | 428/430 |
| 3,459,790 | 8/1969 | Smith | 526/321 |
| 3,697,490 | 10/1972 | Starmer | 526/320 |
| 3,833,381 | 9/1974 | Chen et al. | 222/107 |
| 3,833,382 | 9/1974 | Land | 96/76 C |

Primary Examiner—William R. Dixon, Jr.
Attorney, Agent, or Firm—E. W. Milan

[57] ABSTRACT

Pods for holding photographic solutions have strong edge seal areas and relatively weaker edge seal areas which are designed to break open when pressure is applied to the pod for releasing a photographic solution onto a sheet of paper or film. The weak seal is formed by applying a strip along an edge of a thermoplastic material which is a crosslinked homopolymer or copolymer of 2-acetoacetoxyethyl methacrylate. The homopolymer can be crosslinked by heat, or by the action of formaldehyde, glyoxal, glutaraldehyde, or ethylene diamine. The 2-acetoacetoxyethyl methacrylate also can be copolymerized with a 2-norbornylmethyl ester of methacrylic acid and then crosslinked.

16 Claims, 3 Drawing Figures

FLUID CONTAINERS

BACKGROUND OF THE INVENTION

1. Field of the Invention

This invention relates to edge sealing agents employed in the fabrication of containers or pods containing photographic processing fluid for in-camera developing, and in particular to pods having improved polymeric edge sealing agents that are insoluble in aromatic alcohols.

2. Prior Art

Homopolymers and copolymers suitable for forming the relatively weak burst seal in a pod have been known. Such seal materials are generally located along that edge of a pod which is intended to burst for releasing the photographic developer, and are coated over an inner layer of the pod which is poly (vinyl chloride) or other polymer that resists the developer.

Reference is made to the following representative patents and a publication describing the named seal compostions and others:

3,056,491 — plasticized and unplasticized polyvinyl butyral; also a compostion comprising poly (vinylidene chloride), polyacrylonitrile — poly (vinyl chloride), and an acrylic ester resin.

3,056,492 — cellulose nitrate — acrylic ester resin composition.

3,438,550 — vinylidene chloride — nitrocellulose. ethyl cellulose — acrylic ester resin.

3,750,907 — a mixture of cellulose nitrate or alcohol soluble cellulose acetate butyrate with styrene-methyl methacrylate copolymer or toluene soluble cellulose acetate butyrate or poly (vinyl butyral).

a mixture, with a plasticizer, of alcohol soluble cellulose acetate butyrate, or a copolymer of bisphenol A with epichlorohydrin, or toluene soluble cellulose acetate butyrate.

Research Disclosure, November 1974, Item 12713 poly(2-norbornylmethyl methacrylate).
poly(cyclohexyl methacrylate-co-5(6)-methyl-mercapto-2-norbornylmethyl methacrylate).
polyhdryoxy ether resulting from copolymerization of bisphenol A with epichlorohydrin.
poly(cyclohexyl methacrylate).

It has long been recognized that some photographic developers contain aromatic alcohols such as those having the formula

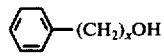

where $x$ is a positive integer from 1 to 3, for example β-phenylethyl alcohol, γ-phenyl-n-propyl alcohol, and benzyl alcohol (see U.S. Pat. No. 2,304,925). Another is a,a'-xylenediol. Such aromatic alcohols are solvents for many edge sealing compositions even though present in the photographic formulation to the extent of only about 1 to 4 percent. With time, the aromatic alcohol dissolves prior compositions, thus allowing contact of the upper and lower poly(vinyl chloride) innermost layers of the pod, and these layers fuse together and form a strong bond that will not break at the desired pressure.

Sometimes it is necessary to apply a small quantity of liquid material in a thin layer over a fairly large surface within a piece of apparatus, such as a camera, without gaining access to the interior of the apparatus. For example, a photosensitive film may be processed or a photograph may be toned by applying on the surface thereof within a camera a layer of a liquid processing reagent, such as a developer for a silver-halide emulsion, or a solution of a toning agent. The present invention makes it possible to apply such a thin layer by incorporating within the apparatus a disposable fluid container in the form of a pod or pouch having at least one wall (and preferably two walls) which is formed of a flexible compressible material, and having sealed edge areas which are relatively weak at one part and relatively stronger at another part for selective opening of the weak seal area while the stronger edge seals are unbroken when the wall is compressed. With this construction, the flexible container wall or walls can be compressed by an internal mechanical device, whereupon the liquid contained within the container is expelled uniformly through the opened weak seal in the desired direction onto the surface to be coated.

It is particularly important that such containers be so constructed as to resist deterioration in storage as the result of chemical action by the contained liquids. Deterioration of the container not only may cause leakage from the container, but also may cause contamination of the contained fluid. Also, action of an aromatic alcohol on the weak edge seal may cause it to become too strong as a result of dissolving the seal composition and permitting the underlying resin areas to fuse together. When this happens, a camera user may find that he cannot successfully develop an exposed film within the camera.

SUMMARY OF THE INVENTION

The principles of the invention depend primarily upon the use of novel sealing compositions which, when locally coated on a part of marginal sealing areas, react to the application of heat and pressure to form seals of lesser strength than the seals between uncoated marginal areas.

I have found that certain polymeric materials, when crosslinked, form excellent relatively weak seals for the bursting edge seals of pod containing photographic developer, which makes such pods especially useful for in-camera film development. Furthermore, the relatively weak seals are insoluble in the presence of an aromatic alcohol and can therefore be employed to advantage as sealants for pods holding photographic developers containing such aromatic alcohols. The polymers and copolymers of the invention combine insolubility with the ability to form burst seals of the desired low strength (0.3 to 0.7 lb/inch) over a wide temperature range, in contrast to the stronger edge seals of 2 to 3 lbs/inch. Another advantage is their good resistance to changes in strength as they age in storage.

In accordance with my invention, the weak seal of a pod is formed by coating one or both mating edges of a pod with a layer of a crosslinked polymer or copolymer comprising an acrylic acid ester containing an active methylene group. An example of such an acrylic acid ester is 2-acetoacetoxyethyl methacrylate, as described in U.S. Pat. No. 3,459,790, having the formula:

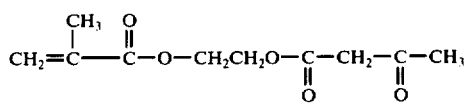

Advantageously, the copolymer is with a 2-norbornylmethyl ester of methacrylic acid.

The homopolymer and copolymer can be prepared by conventional addition polymerization reactions.

For example poly(2-acetoacetoxyethyl methacrylate) was prepared by refluxing in a 65° C bath 100 grams of the monomer, 400 ml of acetone and 1 gram of 2,2'-azobis(2-methylpropionitrile) for 6 hours, and using the resulting polymer solution in the examples.

The copolymer poly (2-acetoacetoxyethyl methacrylate-co-2-norbornylmethyl methacrylate) in a 50:50 weight ratio was prepared by refluxing in 65° C bath 10 grams of 2-norbornylmethyl methacrylate, 10 grams of 2-acetoactoxyethyl methacrylate, 80 ml of acetone, and 0.80 gram of 2,2'-azobis (2-methylpropionitrile) for 24 hours, and using the resulting copolymer solution in the examples.

The copolymer in a 25:75 weight ratio was prepared by refluxing in a 70° C bath 75 grams of 2-norbornylmethyl methacrylate, 25 grams of 2-acetoacetoxyethyl methacrylate, 400 mol of acetone, and 1 gram of 2,2'-azobis (2-methylpropionitrile) for 94 hours. A portion of the solution was blended with methanol and the resulting white solid was dried in a vacuum at 35° C for 3 hours. It had $\{n\} = 0.29$ (chloroform) and Tg = 100.5° C. The remaining portion of the solution was used in the examples.

THE DRAWINGS

THE PREFERRED EMBODIMENTS

Figure 1:
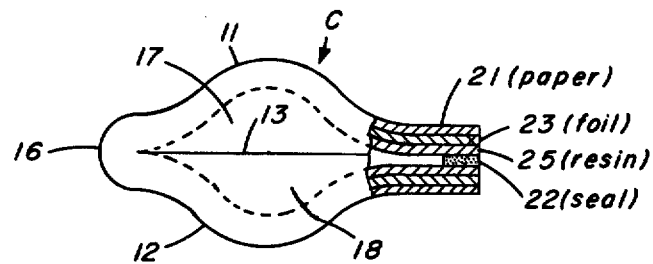
FIG. 1 is a side elevational view, partly broken away and shown in section, of a photographic developer pod in accordance with the invention.
Figure 2:
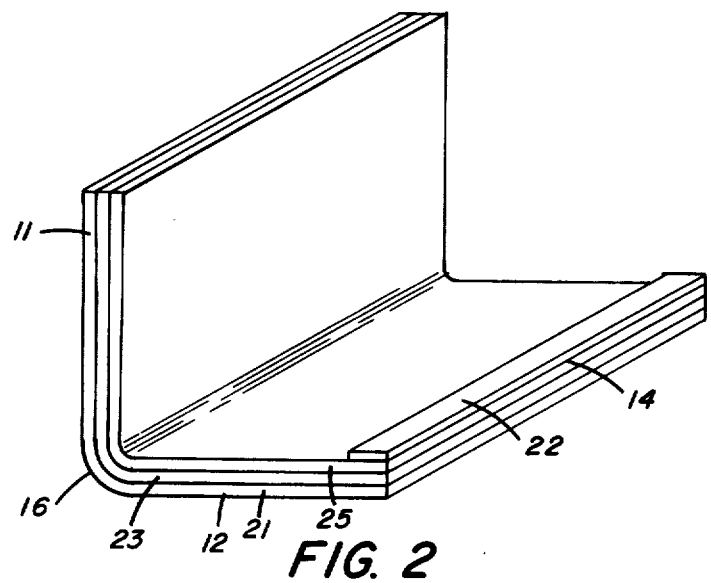
FIG. 2 is a perspective view of a blank which can be folded to form the pod of FIG. 1.
Figure 3:
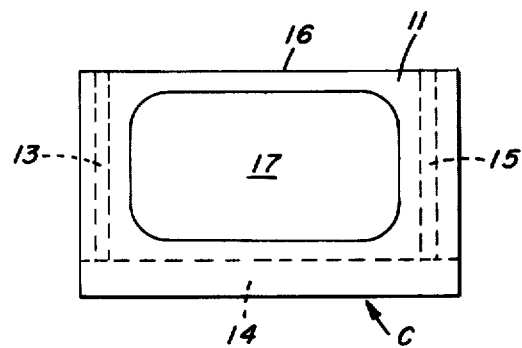
FIG. 3 is a plan view of the pod of FIG. 1.

FIGS. 1 and 3 show a rectangular container C comprising an upper wall 11 and a lower wall 12, both of flexible material, which are sealed together along marginal areas 13, 14, 15 extending around three sides of the container. The fourth side 16 is closed as a fold of the laminated sheet from which the container is formed; but this side also could comprise two edges sealed together when forming the container from separate sheets. The internal areas of the container walls are not sealed together, but are spaced apart to form a storage space for liquid in the form of bubble-like protuberances 17, 18 on each side of the container.

Now, referring to FIG. 1, the two flexible walls 11 and 12 are of laminated construction and include several layers which are adhesively joined to one another. Specifically, layer 21 of strong kraft paper is adhered to layer 23 of metal foil, such as lead or aluminum which is impervious to the passage of liquid and to the passage of air from the outside into the liquid. Such paper-foil laminates are generally purchased in sheet form as they are readily available on the market.

The innermost layer 25 is a polymeric resinous material such as polyvinyl chloride or a copolymer of vinyl chloride with 2-15 percent by weight of vinyl acetate which is resistant to the action of the contained liquid. Layer 25 can be applied to the foil by extrusion, or solvent coating, or by an adhesive composition. A final layer 22 is the novel sealing composition of the present invention which is coated as a narrow strip along one long edge of the pod where a relatively weak bursting seal is wanted.

The two halves 11 and 12 of the container are joined together along marginal portions 13, 14, 15 by heat and pressure sealing. Where the layers of resin 25 are in contact with one another along edges 13 and 15 a strong seal results such as 2 to 3 lbs/inch. Where the strip 22 along edge 14 contacts layer 25, a relatively weaker bursting seal results, such as 0.3 to 0.7 lb/inch. When the photograhic processing liquid is to be expelled through the weak seal on edge 14 by passing a pair of rolls over the container, the nip of the rolls can be positioned at the back edge 16 and moved toward the front edge 14 to break seal 22 and expel the liquid. Success is achieved when the seals at edges 13 and 15 are enough stronger than weak seal 22 to resist bursting.

Instead of coating only strip 22 along the weak seal edge, both mating edge areas may be similarly coated so that the final seal along that edge is by one strip to the other.

Side 16 need not be sealed at all for operability, although it should be sealed for storage purposes. When back edge 16 is formed by sealing two laminates together, success can be achieved when the seal at edge 16 is stronger, weaker, or the same strength as seal 22. Such a seal on the back edge can be accomplished with the same coating composition as on edge 14 for ease of manufacture. When seals 16 and 22 are by the same alcohol-resistant composition and are of equal strength, the container or pod can be positioned with either edge forward for ease in assembly of film packs or rolls.

Referring again to FIG. 1, even though back edge 16 of the container is closed inherently, it is desirable to pinch and heat seal the adjoining areas together so as to form a streamline design to make it easy to pass a pair of compressing rollers or similar compressing devices across the container.

Instead of sealing the entire length of edge 14 under conditions to form a weak seal, it sometimes is desirable to provide alternate areas of weak and strong sealing to assure uniform distribution of the liquid contents. For example, two areas coated with weak sealing material may be provided, spaced apart by a central or intermediate area of strong sealing material (such as the vinyl polymer or copolymer layer) whereby the liquid is ejected in two separate streams which merge subsequently.

A preferred embodiment is concerned with the use of crosslinked homo- and copolymers containing units of 2-acetoacetoxyethyl methacrylate, the homopolymer being sometimes called Polymer H hereinafter, in the preparation of weak pod seals. The monomer has the formula:

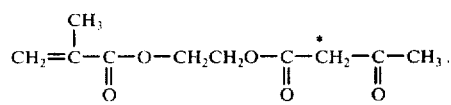

The methylene group (marked by the asterisk) flanked by two carbonyl groups is an "active methylene" group. When the homopolymer, poly(2-acetoacetoxyethyl methacrylate) is heated, it tends to become insoluble, possibly as the result of the formation of crosslinks via the enol form, or possibly via hydrogen bond formation involving this form.

This compound reacts with aldehydes, e.g., formaldehyde. Monoaldehydes are, therefore, difunctional toward Polymer H, and dialdehydes, such as glyoxal, are tetrafunctional.

Polymer H also reacts with amines and diamines, which therefore act as crosslinkers.

In general, crosslinking can be accomplished with any gelation hardener such as ethylene diamine, bis(vinyl-sulfonylmethyl) (or ethyl) ether, bis(vinylsulfonyl)alkanes, and aldehydes. Advantageously, the hardener should be used in an amount between 1 to 2 mols per mol of crosslinkable monomer, but an amount down to as low as 0.25 mol per mol can also be used.

Examples of the use of Polymer H in forming crosslinked benzyl alcohol insoluble compositions for pod edge seals follow. The following polymers were tested:

1. The homopolymer (Polymer H);
2. A copolymer of 2-acetoacetoxyethyl methacrylate and 2-norbornylmethyl methacrylate containing 50% by weight of each compound (sometimes called Copolymer C hereinafter);
3. A copolymer of 2-acetoacetoxyethyl methacrylate and 2-norbornylmethyl methacrylate containing 25% by weight of the former (sometimes called Copolymer D hereafter). 2-norbornylmethyl methacrylate has the strucutre:

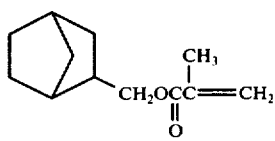

and is representative of 2-norbornyl methacrylate esters having the following structural formula (as in U.S. Pat. No. 3,243,416), that can be copolymerized with 2-acetoacetoxyethyl methacrylate:

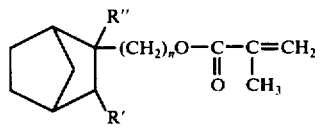

wherein R' selected from the group consisting of a hydrogen atom, a monovalent aliphatic group (preferably alkyl) of from 1 to 4 carbons, and a phenyl group; R" is selected from the group consisting of a hydrogen atom and a monovalent aliphatic group of from 1 to 2 carbons, and $n$ is a whole number from 0 to 1.

Other suitable 2-norbornyl methacrylate esters are:

2-norbornyl methacrylate
3-methyl-2-norbornylmethyl methacrylate
2,3-dimethyl-2-norbornylmethyl methacrylate
3-phenyl-2-norbornylmethyl methacrylate
2-(3-methyl-2-norbornyl)ethyl methacrylate
2-(2,3-dimethyl-2-norbornyl)ethyl methacrylate
2-(3-phenyl-2-norbornyl)ethyl methacrylate
2-(2-norbornyl)ethyl methacrylate
3-(3-methyl-2-norbornyl)propyl methacrylate
3-(2,3-dimethyl-2-norbornyl)propyl methacrylate
3-(3-phenyl-2-norbornyl)propyl methacrylate
3-(2-norbornyl)propyl methacrylate
3-ethyl-2-norbornylmethyl methacrylate
2,3-diethyl-2-norbornylmethyl methacrylate
3-butyl-2-ethyl-2-norbornylmethyl methacrylate The polymers and copolymers of the invention having a suitable degree of polymerization are those having an inherent viscosity in benzene or chloroform measured at a concentration of 0.25 g/deciliter of solution at 25° C ranging from about 0.2 to 1, preferably about 0.3 to 0.8.

The general procedure was to dissolve the polymer or copolymer in methylene chloride (5 ml per gram) and cast a film on a glass slide, which was then appropriately treated. Stoichiometric amounts of solutions of the crosslinking additives were added to the methylene chloride solutions immediately before casting the films. The glyoxal was used as a 40% by weight solution in water; the glutaraldehyde, as a 50% by weight water solution. One-half of the slide bearing the film was then immersed in 100% benzyl alcohol for 1 hour, then dried in a vacuum at 100° C for 1 hour, and the two halves of the slide compared to ascertain the action of the benzyl alcohol. Benzyl alcohol was used as a conveniently available representative of aromatic alcohols.

The results are given in Table II.

TABLE II

| Ex. | Material | Treatment | Treatment Time | Action in 100% Benzyl Alcohol |
|---|---|---|---|---|
| 1 | Polymer H | None | None | Soluble |
| 2 | " | Stand at room temperature | 1/2 hour | Soluble |
| 3 | " | Heat at 60 to 65° C | 1 hour | Soluble |
| 4 | " | Heat at 95° C | 1 hour | Partly soluble |
| 5 | " | Add formaldehyde at room temperature (1) | 2 hours | Insoluble; very swollen |
| 6 | " | Same at 60 to 65° C | 2 hours | Insoluble; Very swollen |
| 7 | " | Same at room temperature | 3 days | Insoluble; swollen |
| 8 | " | Add formaldehyde at 70° C (2) | 1 hour | Insoluble; slightly swollen |
| 9 | " | Add glyoxal at room temperature (3) | 1 1/4 hours | Insoluble; slightly swollen |
| 10 | " | Add glutaraldehyde at room temperature (4) | 1 hour | Insoluble; slightly swollen |
| 11 | " | Add ethylenediamine (8) | | Gelled at once |
| 12 | " | Add ethylenediamine at room temperature (5) | 1 hour | Insoluble; swollen |
| 13 | Copolymer C | Add glyoxal at room temperature (6) | 1 hour | Insoluble; swollen |
| 14 | Copolymer D | Add glyoxal at room temperature (7) | 1 hour | Insoluble; moderately swollen |

(1) 20% solids; gelled in 2 minutes
(2) 4% solids; no gel in 3 days
(3) 4% solids; no gel in 3 days. A 20% solids solution plus glyoxal gelled in 2 minutes
(4) 4% solids; no gel in 3 days. A 20% solids solution plus glyoxal gelled in 3/4 of an hour.
(5) 4% solids
(6) 4% solids
(7) 4% solids
(8) 20% solids It is apparent that simply heating 100% Polymer H at 60° to 95° C for more than 1 hour is not enough to achieve insolubility in 100% benzyl alcohol, but other tests with 4% benzyl alcohol showed that Polymer H crosslinked by heating was not soluble and could be used successfully for making a weak pod seal. Reaction with formaldehyde causes crosslinking and the product is insoluble but swells in 100% benzyl alcohol. Glyoxal and glutaraldehyde give tightly crosslinked products that are insoluble and swell very little in 100% benzyl alcohol. At the low concentration of benzyl alcohol in a photographic developer, these crosslinked compositions formed by heating, or those containing the hardeners and crosslinkers formaldehyde, glyoxal, ethylene diamine, and glutaraldehyde are acceptably resistant to solution.

The reaction with the aldehydes is concentration dependent; a 4% solids solution was not gelled by adding, e.g., glyoxal. An acceptable range is 1 to 10% solids to avoid gelation before application to form a seal.

Examples of the fabrication of pods using H, C and D formulations follow. In each example, the solution containing homopolymer or copolymer, and crosslinking agent when used, was coated along one edge 22 of a blank, treated (if desired), and then the blank was folded and the seal effected by heat and pressure. Coating was at a level of 160 mg/ft² using a 4% by weight solids solution.

Burst strength of a seal was determined by cutting out a strip ½-inch wide perpendicularly across the weak seal (of an actual pod, or a simulated pod), placing the adjacent strip sections in separate jaws of an Instron tensile tester, pulling the jaws apart, noting the force in pounds required to peel the two halves of the seal apart, and doubling the value to establish the burst strength in lbs/inch.

EXAMPLE 15

Polymer H was coated from a solution in acetone. After incubation at 120° F (49° C) for 3 days, the burst strength-temperature profile was: sealed at 275° F (135° C), 0.27 lbs/in; 300° F (149° C), 0.26 lbs/in; 325° F (163° C), 0.32 lbs/in; 350° F (177° C), 0.23 lbs/in. These seals were subjected to the action of a solution containing 4% benzyl alcohol and found to be insoluble.

EXAMPLE 16

A 4% solids solution of Copolymer C in acetone was treated with glyoxal at the rate of 0.09 gram glyoxal per 8 grams of copolymer. The burst strength-temperature profile was: sealed at 225° F (109° C), 0.39 lbs/in; 250° F (121° C), 0.74 lbs/in; 275° F (135° C), 0.72 lbs/in; 300° F (149° C), 0.60 lbs/in. The product of the treatment was insoluble in 100% benzyl alcohol.

EXAMPLE 17

A 4% solids solution of Copolymer D in acetone, untreated, was used. Burst strengths varied but little from 0.53 lbs/in when sealed at 250° F (121° C) to 0.38 lbs/in at 375° F (191° C). The material was not affected by incubation at 145° F (63° C) for 3 days. When sealed at 300° F (149° C), the incubated material had a burst strength of 0.46 lbs/in. When it was sealed and then incubated, the strength was 0.30 lbs/in; and when it was incubated and then sealed the burst strength ws 0.45 lbs/in.

EXAMPLE 18

The solution of Example 17 was treated and crosslinked with glyoxal at the rate of 0.19 gram glyoxal per 8 grams polymer. A film of this product was insoluble in 100% benzyl alcohol. The temperature-burst strength profile was broad and uniform as shown in Table III.

TABLE III

| Sealing Temperature, ° F (° C) | Burst Strength, lbs./inch |
|---|---|
| 225 (107) | 0.38 |
| 250 (121) | 0.55 |
| 275 (135) | 0.49 |
| 300 (149) | 0.40 |

TABLE III-continued

| Sealing Temperature, ° F (° C) | Burst Strength, lbs./inch |
|---|---|
| 325 (163) | 0.38 |
| 350 (177) | 0.44 |

Incubation for 3 days at 145° F (63° C) had no effect on the seal strength.

EXAMPLE 19

The solution of Example 17 was treated and crosslinked with glutaraldehyde at the rate of 0.13 gram glutaraldehyde per 8 grams polymer. The product was insoluble in 100% benzyl alcohol. The burst strength profile was shifted to lower temperatures by this substitution of glutaraldehyde for glyoxal: sealed at 225° F (107° C), 0.29 lbs/in; 250° F (121° C), 0.51 lbs/in; 275° F (135° C), 0.50 lbs/in.

EXAMPLE 20

A 4% solution in acetone of Polymer H was treated with ethylenediamine, the crosslinked product was insoluble in 100% benzyl alcohol. The burst seal strength after coating from a 4% solids solution in acetone was 0.13 lbs/in when sealed at 400° F (204° C).

While the foregoing examples relate to copolymers containing 50% or 25% by weight of 2-acetoacetoxyethyl methacrylate, balance 2-norbornylmethyl methacrylate, successful results can be secured when the former comprises 10% to 50% and the latter 90% to 50% by weight of the copolymer.

The invention has been described in detail with particular reference to preferred embodiments thereof, but it will be understood that variations and modifications can be effected within the spirit and scope of the invention.

I claim:

1. In a container for a fluid photographic processing material including aromatic alcohol comprising
a pair of opposed walls marginally sealed together over a substantial area to provide an internal cavity adapted to retain such material, at least one of said walls being flexible and deformble, the internal surfaces of said walls bounding said cavity comprising a polymer which resists deterioration by the action of such processing material, said opposed walls being marginally sealed together over a first part of said area polymer-to-polymer, and a polymeric sealing composition interposed between said opposed walls over a second part of said area forming a seal of less strength then the seal over said first part of said area, whereby said container preferentially opens along said second part of said area upon the application of pressure to said container, the improvement wherein:
said polymeric sealing composition consists essentially of crosslinked homopolymer or copolymer of an acrylic acid ester having the formula:

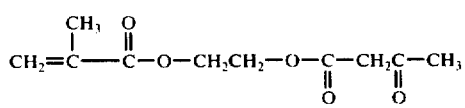

said homopolymer or copolymer prior to being crosslinked having an inherent viscosity in benzene or chloroform measured at a concentration of 0.25 g/deciliter of solution at 25° C ranging from about 0.2 to 1, said seal formed by said polymeric sealing composition between said opposed walls being substantially resistant to changes in burst strength of said seal during storage of said container.

2. In a container in accordance with claim 1, said composition being a homopolymer of said acrylic acid ester crosslinked by heat treatment.

3. In a container in accordance with claim 1, said composition being a homopolymer of said acrylic acid ester crosslinked with formaldehyde.

4. In a container in accordance with claim 1, said composition being a homopolyer of said acrylic acid ester crosslinked with glyoxal.

5. In a container in accordance with claim 1, said composition being a homopolymer of said acrylic acid ester crosslinked with glutaraldehyde.

6. In a container in accordance with claim 1, said composition being a homopolymer of said acrylic acid ester crosslinked with ethylenediamine.

7. In a container in accordance with claim 1, said composition being a crosslinked copolymer of said acrylic acid ester with a 2-norbornyl ester of methacrylic acid having the formula:

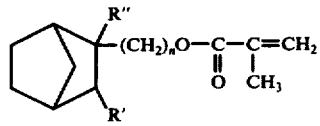

wherein R' is selected from the group consisting of a hydrogen atom, a monovalent aliphatic group of from 1 to 4 carbons, and a phenyl group; R" is selected from the group consisting of a hydrogen atom and a monovalent aliphatic group of from 1 to 2 carbons; and $n$ 0 to 1.

8. In a container in accordance with claim 7, said 2-norbornyl ester being 2-norbornylmethyl methacrylate.

9. In a container in accordance with claim 8, said acrylic acid ester being present in an amount between 10 and 50% and said 2-norbornylmethyl ester being present in an amount between 90 and 50% of said copolymer by weight.

10. In a container in accordance with claim 9, said acrylic acid ester being present in an amount between 25 and 50% and said 2-norbornylmethyl ester being present in an amount between 50 and 75% of said copolymer by weight.

11. In a container in accordance with claim 9, said copolymer being crosslinked with glyoxal.

12. In a container in accordance with claim 9, said copolymer being crosslinked with glutaraldehyde.

13. In a container in accordance with claim 7, said 2-norbornyl ester being selected from the group consisting of
2-norbornyl methacrylate
3-methyl-2-norbornylmethyl methacrylate
2,3-dimethyl-2-norbornylmethyl methacrylate
3-phenyl-2-norbornylmethyl methacrylate
2-(3-methyl-2-norbornyl)ethyl methacrylate
2-(2,3-dimethyl-2-norbornyl)ethyl methacrylate
2-(3-phenyl-2-norbornyl)ethyl methacrylate
2-(2-norbornyl)ethyl methacrylate
3-(3-methyl-2-norbornyl)propyl methacrylate
3-(2,3-dimethyl-2-norbornyl)propyl methacrylate
3-(3-phenyl-2-norbornyl)propyl methacrylate
3-(2-norbornyl)propyl methacrylate
3-ethyl-2-norbornylmethy methacrylate
2,3-diethyl-2-norbornylmethyl methacrylate
3-butyl-2-ethyl-2-norbornylmethyl methacrylate.

14. In a container in accordance with claim 1, wherein said seal formed by said polymeric sealing composition between said opposed walls has a peel strength of 0.3 to 0.7 lb/in. determined in an Instron Tensile testing machine.

15. In a container in accordance with claim 1 wherein said fluid photographic processing material contains 1% to 4% of said aromatic alcohol.

16. In accordance with claim 15 wherein said aromatic alcohol is benzyl alcohol.

* * * * *